(12) United States Patent
Schwarz

(10) Patent No.: US 12,134,250 B2
(45) Date of Patent: *Nov. 5, 2024

(54) FOOD PACKAGING PRODUCTS AND METHODS

(71) Applicant: SONOCO DEVELOPMENT, INC., Hartsville, SC (US)

(72) Inventor: Richard Schwarz, Livingston, TX (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/223,668

(22) Filed: Jul. 19, 2023

(65) Prior Publication Data
US 2023/0356513 A1 Nov. 9, 2023

Related U.S. Application Data

(63) Continuation of application No. 16/505,293, filed on Jul. 8, 2019, now Pat. No. 11,752,741.
(Continued)

(51) Int. Cl.
B32B 27/08 (2006.01)
B32B 27/20 (2006.01)
(Continued)

(52) U.S. Cl.
CPC ............. *B32B 27/08* (2013.01); *B32B 27/20* (2013.01); *B32B 27/308* (2013.01); *B32B 27/32* (2013.01);
(Continued)

(58) Field of Classification Search
CPC .......... B32B 1/00; B32B 27/08; B32B 27/20; B32B 27/308; B32B 27/32; B32B 27/36;
(Continued)

(56) References Cited

U.S. PATENT DOCUMENTS 3,844,810 A 10/1974 Pollard
5,156,904 A 10/1992 Rice et al.
(Continued)

FOREIGN PATENT DOCUMENTS

EP 0666285 A1 8/1995

OTHER PUBLICATIONS

International Preliminary Report on Patentability for International application No. PCT/US2019/040847; Dated Jan. 12, 2021; 7 pages.
(Continued)

*Primary Examiner* — James C Yager
*Assistant Examiner* — Thomas J Kessler
(74) *Attorney, Agent, or Firm* — Nelson Mullins Riley & Scarborough LLP

(57) ABSTRACT

In an embodiment, the invention comprises a packaging structure or formable sheet comprising a first layer which comprises post-consumer resin and, in some embodiments, a polyolefin; a second layer adjacent the first layer which comprises: post-consumer resin polyethylene terephthalate; a polyolefin; ethylene methyl acrylate; and ethylene/methyl acrylate/glycidyl methacrylate terpolymer; and in some embodiments, polypropylene maleic anhydride copolymer; and a third layer adjacent the second layer which comprises post-consumer resin and, in some embodiments, a polyolefin.

20 Claims, 13 Drawing Sheets

Related U.S. Application Data

(60) Provisional application No. 62/846,977, filed on May 13, 2019, provisional application No. 62/694,820, filed on Jul. 6, 2018.

(51) Int. Cl.
| | |
|---|---|
| *B32B 27/30* | (2006.01) |
| *B32B 27/32* | (2006.01) |
| *B32B 27/36* | (2006.01) |
| *B65D 65/40* | (2006.01) |
| *B65D 65/42* | (2006.01) |

(52) U.S. Cl.
CPC .............. *B32B 27/36* (2013.01); *B65D 65/40* (2013.01); *B65D 65/42* (2013.01); *B32B 2250/24* (2013.01); *B32B 2250/40* (2013.01); *B32B 2255/10* (2013.01); *B32B 2255/26* (2013.01); *B32B 2264/102* (2013.01); *B32B 2439/70* (2013.01)

(58) Field of Classification Search
CPC ............ B32B 2250/03; B32B 2250/24; B32B 2250/40; B32B 2255/10; B32B 2255/26; B32B 2264/102; B32B 2270/00; B32B 2272/00; B32B 2307/7244; B32B 2307/7246; B32B 2439/00; B32B 2439/70; B65D 40/42
See application file for complete search history.

(56) References Cited

U.S. PATENT DOCUMENTS

| | | | |
|---|---|---|---|
| 5,534,317 | A | 7/1996 | Herman et al. |
| 5,824,745 | A | 10/1998 | Brown |
| 6,077,904 | A | 6/2000 | Dalgewicz, III et al. |
| 6,773,735 | B1 | 8/2004 | Dalgewicz, III |
| 2001/0008240 | A1 | 7/2001 | Herrin |
| 2003/0068455 | A1 | 4/2003 | Oguro |
| 2005/0161471 | A1 | 7/2005 | Grenda |
| 2008/0145670 | A1 | 6/2008 | Song et al. |
| 2008/0254245 | A1 | 10/2008 | Penescu et al. |
| 2018/0015707 | A1 | 1/2018 | Kani |

OTHER PUBLICATIONS

International Search Report and Written Opinion for corresponding International Application No. PCT/US2019/040847, dated Oct. 4, 2019.

Ruey Shan Chen*, Mohd Hafizuddin Ab Ghani, Mohd Nazry Salleh, Sahrim Ahmad, Sinyee Gan, "Influence of Blend Composition and Compatibilizer on Mechanical and Morphological Properties of Recycled HDPE/PET Blends" Materials Sciences and Applications, 2014, 5, 943-952.

Mohd Nazry Salleh, "Preparation and Characterization of High-Density Polyethylene Blends and Recycled Poly(ethylene terephthalate)", Applied Mechanics and Materials vol. 695 (2015) pp. 131-134.

Mohd Nazry Salleh, Sahrim Ahmad, Mohd Hafizuddin Ab Ghani, and Ruey Shan Chen,"Effect of analysis compatibilizer on impact and morphological of recycled HDPE/PET blends," AIP Conference Proceedings 1571, 70 (2013); https://doi.org/10.1063/1.4858632.

Kasama Jarukumjorn* and Sukunya Chareunkvun, Received: May 18, 2006; Revised: Oct. 13, 2006; Accepted: Nov. 15, 2006, "Compatibilization of Recycled High Density Polyethylene (HDPE)/Polyethylene Erephthalate , (PET) Blends," School of Polymer Engineering, Suranaree University of Technology, Nakhon Ratchasima 30000, Thailand, E-mail: kasama@g.sut.ac.th, * Corresponding author Suranaree J. Sci. Technol. 14.

C. G. Iñiguez, E. Michel, V.M Gonzalez-Rmero, R. Gonzalez-Nunez, et.al., "Morphological stability of postconsumer PET/HDPE blends", Polymer Bulletin 45(3):295-302—Nov. 2000. (8 pages).

Nobuyuki Imamura1, Hiroki Sakamoto2, Yuji Higuchi2, Hiroyuki Yamamoto3, Shinichi Kawasaki3, Kazushi Yamada3*, Hiroyuki Nishimura3, Takahiro Nishino4, Effectiveness of Compatibilizer on Mechanical Properties of Recycled PET Blends with PE, PP, and PS, Materials Sciences and Applications, 2014, 5, 548-555 Published Online Jun. 2014 in SciRes. http://www.scirp.org/journal/msa http://dx.doi.org/10.4236/msa.2014.58057.

Akbari, M.; Zadhoush, A.; Haghighat, M., PET PP blending by using PP g MA synthesized by solid phase, Journal of Applied Polymer Science , vol. 104 (6)—Jan. 15, 2007.

Natalie Zdrazilova1, Berenika Hausnerova1, Takeshi Kitano2 and Petr Saha1, Rheological Behaviour of PP/PET and Modified PP/PET Blends. II. Dynamic Viscoelastic Properties, Polymers & Polymer Composites, vol. 12, No. 5, 2004.

Tadashi Otsuka1, Ayako Kurosawa1, Masaki Maeda1, Kazushi Yamada2, Masuo Murakami2, Hiroyuki Hamada2, Barrier, Adsorptive, and Mechanical Properties of Containers Molded from PET/PP Blends for Use in Pharmaceutical Solutions, Materials Sciences and Applications, 2013, 4, 589-594.

Christoph Burgstaller, "TCKT GmbH, Making PP-PET Mutilayer Films Recycleable," Plastics Engineering, Feb. 2019.

Henry C.A. Lim, "The influence of reactive modification on the compatibility of polyolefins with non-olefinic Thermoplastics, A Doctoral Thesis." Submitted in partial fulfillment of the requirements for the award of Doctor of Philosophy of Loughborough University. Jan. 2011.

FOOD PACKAGING PRODUCTS AND METHODS

CROSS-REFERENCE TO RELATED APPLICATIONS

This application is the continuation of U.S. Non Provisional application Ser. No. 16/505,293, filed Jul. 8, 2019, entitled "Food Packaging Products and Methods," that claims priority to U.S. Provisional Patent Application No. 62/694,820, filed Jul. 6, 2018, entitled "Food Packaging Products and Methods," and U.S. Provisional Patent Application No. 62/846,977, filed May 13, 2019, of the same title, each of which is incorporated by reference in its entirety herein.

FIELD OF THE INVENTION

The present invention relates generally to packaging for food products and methods for making the same.

BACKGROUND

Recent studies have indicated that use of high impact polystyrene (HIPS) in food-contact applications may result in some migration of styrene into the associated food products. In some jurisdictions, HIPS has been banned from food service packaging. Similarly, polyvinylidene chloride (PVdC) has an unfavorable chlorine content and may have chemical migration issues when in contact with food products. Thus, food manufacturer, distributor and customer needs demand food-contact packaging materials which are free of HIPS and/or PVdC, but without losing the various benefits attributable to such materials.

As a replacement material, polyethylene terephthalate (PET) is useful in food packaging due to, for example, its strength, oxygen and moisture barrier, resistance to aggressive food oils, and extrusion and thermoforming characteristics. PET, however, has disadvantages as well. While it has certain oxygen barrier characteristics, those characteristics are not always sufficient to meet industry needs. In addition, PET is difficult to trim and requires the trim tooling to be in excellent condition in order to properly trim PET products. Improper trim can result in defective partial cuts and/or plastic fragments potentially contaminating the packaging. Still further, conventional PET containers may deform when heated to approximately 160° F. or above. If a food product is heated to approximately 180° F. before dispensing into a container, which is common in the food preparation industry, the standard PET container may deform. PET requires modification and crystallization in order to meet all portion control specifications. For example, PET requires certain additives to control WVTR, OTR, trim force, seal/peel force, hot fill resistance and impact resistance.

The present inventors, through ingenuity and hard work, have developed food-contact packaging materials and structures which have a unique synergy of components, providing various advantages to the packaging structure. For example, the inventive materials and packaging meet and exceed existing industry requirements for oxygen barrier, moisture barrier, hot fill capability of at least 180° F., improved trimability, oil resistance, acidic resistance, toughness requirements, and heat sealing capability. In an embodiment, the inventive materials and packaging are sustainably formed using more sustainable materials than are commonly used in the industry.

BRIEF SUMMARY

In an embodiment, the invention provides a compatibilized polymer blend with a specific heterophasic morphology, capable of replacing HIPS/PVdC in ambient fill technologies. In an embodiment, the invention is directed to a formable sheet and/or a packaging structure comprising various combinations of materials such as PET (i.e. crystallizing PET (CPET), impact modified PET, and/or amorphous PET (APET)), hexanedioic acid-co-1,3-benzenedimethanamine (HABMA), polytrimethylene furandicarboxylate (PTF), bio-PET homopolymer, polyvinyl alcohol (PVOH), polyethyleneimine (PEI) solution. In some embodiments, post-consumer resin (PCR) components are utilized in the invention.

In a particular embodiment, the invention is directed to a formable sheet and/or a packaging structure comprising PCR PET, polypropylene (PP), ethylene methyl acrylate (EMA), ethylene/methyl acrylate/glycidyl methacrylate terpolymer (EMA-GMA), and, optionally, blue-white $TiO_2$ color concentrate. In an embodiment, PEI is used as a coating on the outside of the tray, optionally only in non-food exposed areas.

In an embodiment, the PP could be replaced with high density polyethylene (HDPE) post-consumer materials, further reducing manufacturing costs and improving sustainability, water vapor transmission rates, and trim force. Similarly, EMA may be partially or wholly replaced with an HDPE material, which may be useful as an impact modifier and may further reduce the costs of the packaging.

The unique synergy of the inventive components provides various advantages to the packaging structure. For example, the packaging meets and exceeds existing industry requirements for oxygen barrier, moisture barrier, hot fill capability of at least 180° F., reduction in the required trim force, oil resistance, toughness requirements, and heat sealing capability. In an embodiment, the packaging structure, formable sheet, sheet tray, and/or individual containers of the invention are ovenable (microwavable, convection ovenable, traditional ovenable, or otherwise). The packaging is sustainably formed, using more sustainable materials than are commonly used in the industry, in an embodiment.

In an embodiment, the packaging is capable of withstanding and maintaining a hermetic heat seal with a peelable lid film. The packaging, in some embodiments, greatly reduces or eliminates lift (the unwanted or premature peeling back of a film or lid from the rim or flange of the packaging).

In an embodiment, the packaging comprises a tray of multiple portion control containers, such as condiment cups (i.e. ketchup or other dipping sauces) or yogurt/pudding-type cups. The cups, in this embodiment, may be separated after being filled and sealed and/or may be separated by the consumer at the time of consumption. In an embodiment, the packaging comprises individual food product containers. The tray and/or packaging comprises a rigid container in an embodiment. In another embodiment, the packaging comprises a thermoformed container.

While the materials and packaging discussed herein are noted to contain food products, the invention should not be so limited. The inventive compositions and packaging may be useful in any applications known in the art, for example, soaps, detergents, lotions, shampoos, pharmaceuticals, OTC medicines, beverages, and the like.

In an embodiment, the packaging comprises one or more layers. In this embodiment, the layers may comprise a sealing layer, a functional core layer, and/or an oxygen barrier layer. The oxygen barrier layer may be the outermost layer of the structure and the sealing layer may be the innermost layer of the structure, adjacent a food product, for example. In other embodiments, fewer or more layers may be included, in any configuration known in the art.

In an embodiment, PCR PET can be used in the invention at a concentration of approximately 50% to 75% of the core layer. In another embodiment, PCR PET can be used at a concentration of approximately 60% of the core layer. PCR PET can be the majority component in the core layer formulation, up to approximately 68% or 70% concentration, in some embodiments.

In an embodiment, PP or PCR PP can be used at a concentration of approximately 10% to 30% of the core layer. In another embodiment, PP or PCR PP can be used at a concentration of approximately 20%. In another embodiment, PP or PCR PP comprises between approximately 30% and approximately 60%, by weight, of the core layer. In another embodiment, PP or PCR PP comprises between approximately 60%, by weight, of the core layer. In a particular embodiment, EMA and/or EMA-GMA may not be present in an embodiment wherein PP or PCR PP is present in a weight percentage of 30% or greater.

In an embodiment, the invention comprises a packaging structure or formable sheet comprising a first layer which comprises post-consumer resin and a polyolefin; a second layer adjacent the first layer which comprises: post-consumer resin polyethylene terephthalate; a polyolefin; ethylene methyl acrylate; and ethylene/methyl acrylate/glycidyl methacrylate terpolymer; and in some embodiments, polypropylene maleic anhydride copolymer; and a third layer adjacent the second layer which comprises post-consumer resin and a polyolefin.

In an embodiment, the invention comprises a packaging structure or formable sheet comprising a first layer which comprises virgin post-consumer resin and, optionally, a polyolefin; a second layer adjacent the first layer which comprises: post-consumer resin polyethylene terephthalate; a polyolefin; ethylene methyl acrylate; and ethylene/methyl acrylate/glycidyl methacrylate terpolymer; and in some embodiments, polypropylene maleic anhydride copolymer; and a third layer adjacent the second layer which comprises virgin post-consumer resin and, optionally, a polyolefin.

In an embodiment, the invention comprises a packaging structure comprising: a first layer which comprises virgin post-consumer resin; a second layer adjacent the first layer which comprises: post-consumer resin polyethylene terephthalate; polypropylene; ethylene methyl acrylate; and ethylene/methyl acrylate/glycidyl methacrylate terpolymer; and a third layer adjacent the second layer which comprises virgin post-consumer resin.

In some embodiments, the first layer is disposed on an interior of the packaging structure. In some embodiments, the first layer is a food contact layer. The third layer may be disposed on an exterior of the packaging structure. At least one of the first layer, the second layer, and the third layer may additionally comprise blue-white $TiO_2$ color concentrate. The second layer may comprise approximately 5% to approximately 6% blue-white $TiO_2$ color concentrate. The second layer may additionally comprise polypropylene maleic anhydride copolymer. The second layer may comprise approximately 5% polypropylene maleic anhydride copolymer.

The second layer may additionally comprise at least one polyamide produced from m-xylenediamine. The invention may additionally comprise a polyethyleneimine coating disposed on an exterior of the packaging structure, adjacent the third layer. The second layer may comprise approximately 50% to approximately 75% post-consumer resin polyethylene terephthalate. The second layer may comprise approximately 40% to approximately 70% post-consumer resin polyethylene terephthalate. The second layer may comprise approximately 5% to approximately 30% polypropylene. The second layer may comprise approximately 15% to approximately 20% polypropylene. The second layer may comprise approximately 10% ethylene methyl acrylate. The second layer may comprise approximately 1% to about 2% ethylene/methyl acrylate/glycidyl methacrylate terpolymer. The first layer, second layer, and third layer may be melt-adhered or co-extruded.

In another embodiment, the invention comprises a formable sheet comprising: a first layer which comprises virgin post-consumer resin; a second layer adjacent the first layer which comprises: post-consumer resin polyethylene terephthalate; polypropylene; ethylene methyl acrylate; and ethylene/methyl acrylate/glycidyl methacrylate terpolymer; polypropylene maleic anhydride copolymer; and a third layer adjacent the second layer which comprises virgin post-consumer resin. In this embodiment, the second layer may additionally comprise at least one polyamide produced from m-xylenediamine. The invention may additionally comprise a polyethyleneimine coating disposed adjacent the third layer. At least one of the first layer, the second layer, and the third layer may additionally comprise blue-white $TiO_2$ color concentrate. In an embodiment, the formable sheet may be formed into a tray of multiple containers.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
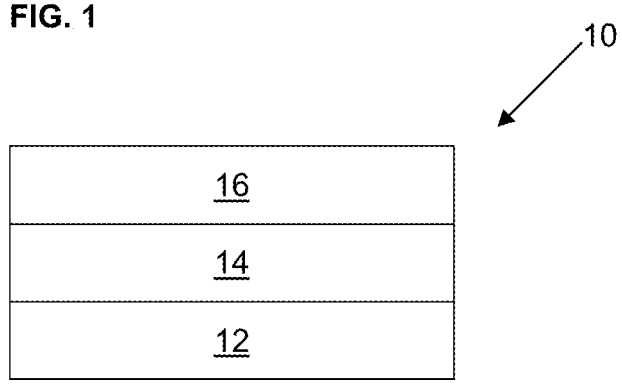
FIG. 1 illustrates a cross-sectional view of one embodiment of the inventive composition.

FIG. 1 illustrates an embodiment of a layered structure in one aspect of the invention, shown in cross-section. In this embodiment the a first layer (also referred to herein as the sealing layer) 16 may be adjacent a second layer (also referred to herein as the functional core layer) 14. The opposite side of the second layer 14 may be adjacent a third layer (also referred to herein as an oxygen barrier layer) 12. The oxygen barrier layer 12 may be adjacent the outside of the container while the sealing layer 16 may be adjacent the food product. Alternatively, the layers may be disposed in a different configuration.

The sealing layer 16, in an embodiment, may comprise any one or more of the following: (a) HABMA (also known as MXD6), an optional colorant, and PCR; (b) HABMA, an optional colorant, and APET; (c) HABMA, PET homopolymer, one or more nucleation agents, and an optional colorant; (d) HABMA and polyethylene terephthalate glycol (PETG); (e) APET; (f) PCR; and/or (g) HABMA. The individual components of the sealing layer 16 may be intermixed, melt blended, or may be layered. In an embodiment, the sealing layer 16 comprises virgin, cleaned PCR plus 5.6% blue-white color concentrate.

In an embodiment, the sealing layer 16 is not only disposed adjacent a food product, but also provides a compatible surface for the heat seal/peel of a lidding film. In an embodiment, the sealing layer 16 additionally allows for easy trim of the sheet 10 or resulting tray, allows direct melt adhesion to the core layer 14 and is a functional barrier to the migration of byproducts (which may form in the core layer during repeated reintroductions as regrind) into any food product contained within the ultimate container.

In an embodiment, the core layer 14 of the sheet 10 will supply hot fill and strength characteristics and the sealing layer 16 need not provide hot fill resistance. In an embodiment, the sealing layer 16 is compatible with other resins and does not cause without unwanted reactions and byproducts. In another embodiment, the sealing layer 16 can withstand up to about 300° F. drying conditions to remove moisture therefrom without agglomeration or degradation.

In an embodiment, PETG may be utilized in the sealing layer 16. In this embodiment, the packaging structure may have a reduced trim force requirement, a heightened seal/peel performance, may be compatible with PET and HABMA, and may have improved adhesion to the adjacent layer(s) when presented in regrind. In an embodiment, PETG may be used in the sealing layer 16 and/or the other layers of the invention.

In an embodiment, the core layer 14 may comprise a composite of virgin resins. In an embodiment, the core layer 14 may comprise: virgin PET resin and optionally, PCR and/or one or more nucleating agents, which may aid in crystallization to meet hot fill requirements. Optionally, the core layer 14 may also include regrind (recycled scrap from post trim operations), colorant, and/or one or more antioxidants. These elements may control or contribute to PCR content, crystallization, opacity, and/or strength, among other benefits. In an embodiment, the core layer 14 is receptive to direct melt adhesion to either or both of the oxygen barrier layer 12 and/or the sealing layer 16. The composition of the core layer 14 allows it to contribute to adhesion, strength, hot fill resistance, opacity, cost reduction with PCR, sustainability from PCR, and decomposition control beyond the ability of any individual components. The composition of the core layer 14 also maintains improved oxygen resistance over virgin PET itself.

In an embodiment, the core layer 14 comprises PCR PET, polypropylene (PP), ethylene methyl acrylate (EMA), ethylene/methyl acrylate/glycidyl methacrylate terpolymer (EMA-GMA), and, optionally, blue-white $TiO_2$ color concentrate. In an embodiment, the PP could be replaced with high density polyethylene (HDPE) post-consumer materials. Similarly, EMA may be partially or wholly replaced with an HDPE material.

Figure 12:
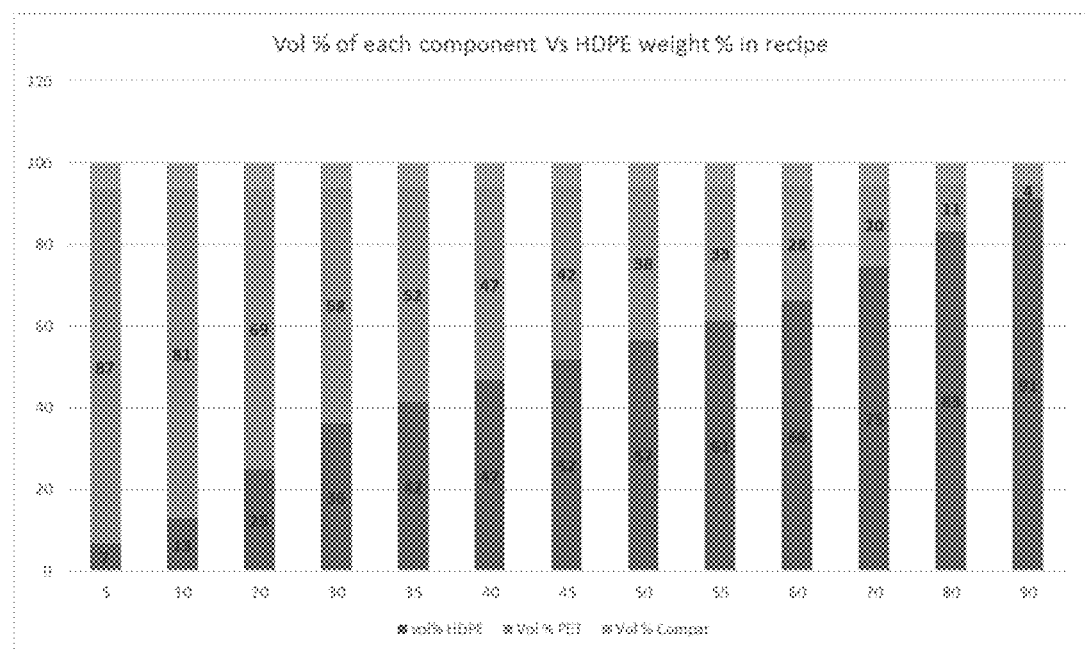
FIG. 12 is a chart which illustrates the volume percentage of HDPE versus PET and a compatiblizer in an embodiment of an inventive composition.

FIG. 12 illustrates the volume percentage of HDPE versus PET and a compatiblizer in an inventive composition. The compatibilizer utilized was PE-GMA (AX8840 Arkema), a random copolymer which disperses PET in HDPE and disperses HDPE in PET. Other compatibilizers could be utilized, such as AX8900, which is advantageous as being acceptable for food contact and could be present in the food-contact layer. Alternatively, AX8840 may be disposed in the core layer.

In the embodiment shown in FIG. 12, the volume percentage of PET and HDPE are equal when HDPE is present at about 40% by weight (the numbers on the X axis indicate weight percentages). HDPE has a lower density, which is why it has a higher volume in the blend than does higher density PET. If PET constitutes the dominant volume, the resulting containers will be stiffer. If HDPE is the dominant volume, the resulting containers will have better hot fill capacity, lower heat seal temperatures, better impact resistance, better water vapor transmission rates, and better puncture force. In an embodiment, the inventive composition avoids the point of equal volume (or near equal volume) because such a blend could exist without knowing which features would dominate in the composition.

In an embodiment, the weight percentage of HDPE is approximately 50% or higher, or approximately 35% or lower. Within the 35% to 50% range, the volumes of HDPE and PET may be too close to equal and it may be unclear which features dominate. In an embodiment of the invention, the weight percentage of PP is also approximately 50% or higher, or approximately 35% or lower.

In an embodiment, the oxygen barrier layer 12 may comprise any one or more of the following: (a) HABMA, an optional colorant, and PCR; (b) HABMA, an optional colorant, and APET; (c) HABMA, PET homopolymer, one or more nucleation agents, and an optional colorant; (d) HABMA and PETG; (e) APET; (f) PCR; (g) HABMA; (h) polyetherimide; and/or (i) a mold release and/or de-nesting agent. The sealing layer 16 and the oxygen barrier layer 12 may, but need not be, comprised of the same materials. In an embodiment, the oxygen barrier layer 12 comprises virgin, cleaned PCR plus 5.6% blue-white color concentrate.

In another embodiment, the oxygen barrier layer 12 is comprised of HABMA and a compatibilizer which allows it to adhere directly to the core layer 14 during melt extrusion. The compatibilizer may be PET, in an embodiment. In an embodiment, a mixture of 15% PET and 85% HABMA has an oxygen barrier which is twenty-two times more resistant than PET alone. In an embodiment, the oxygen barrier layer 12 comprises a blend of PET and HABMA, wherein the HABMA is the major phase (continuous phase) of over 50% by volume. In an embodiment, the oxygen barrier layer 12 comprises a blend of from about 15% to about 50% PET and from about 50% to about 85% HABMA.

In an embodiment, the oxygen barrier layer 12 is very thin and may comprise approximately 1% of the total structure 10. In another embodiment, the oxygen barrier layer 12 is diluted with a less expensive component, like PET, and the layer 12 is thicker than 1% of the structure 10. In an embodiment, the oxygen barrier layer 12 may comprise about 5% or about 10% of the structure 10. Blends of about 15% to about 50% PET and about 50% to about 85% of HABMA in an oxygen barrier layer 12 which comprises about 5% of the structure 10 may be contemplated herein, in an embodiment.

In another embodiment, the oxygen barrier layer 12 and/or the sealing layer 16 (either of which may be referred to herein as a "cap" layer) comprises a concentrated form of HABMA and the core layer 14 comprises CPET. In this embodiment, the cap layer (HABMA) may comprise approximately 10% and the core layer (CPET) 14 may comprise about 90% of the total structure 10. However, in this embodiment, the HABMA may be applied in a thinner cap layer due to its concentrated form. This embodiment may or may not additionally include an additional oxygen barrier layer 12 and/or sealing layer 16.

In an embodiment, the cap layer comprises a standard or concentrated blend of HABMA and CPET. In this embodiment, the HABMA and CPET may be intermixed and the HABMA may comprise approximately 10% of the total composition (i.e. CPET may comprise about 90% of the total composition). This embodiment may or may not additionally include an additional oxygen barrier layer 12 and/or sealing layer 16.

In still another embodiment, the cap layer comprises APET and the core layer 14 comprises CPET. In this embodiment, the cap layer (APET) may comprise approximately 10% and the core layer (CPET) 14 may comprise about 90% of the total structure 10. This embodiment may or may not additionally include an additional oxygen barrier layer 12 and/or sealing layer 16.

In still another embodiment, the cap layer comprises APET and the core layer 14 comprises a blend of CPET and HABMA. In this embodiment, the cap layer (APET) may comprise approximately 10% and the core layer (CPET/HABMA) 14 may comprise about 90% of the total structure 10. This embodiment may or may not additionally include an additional oxygen barrier layer 12 and/or sealing layer 16.

In a further embodiment, the cap layer comprises APET and the core layer 14 comprises a blend of CPET and HABMA. In this embodiment, the cap layer (APET) may comprise approximately 10% and the core layer (CPET/HABMA) 14 may comprise about 90% of the total structure 10. This embodiment may or may not additionally include an additional oxygen barrier layer 12 and/or sealing layer 16.

In a still further embodiment, the sealing layer 16 comprises APET, the core layer 14 comprises CPET, and the oxygen barrier layer 12 comprises polyethyleneimine (PEI) solution.

In another embodiment, the cap layer comprises PETG and the core layer 14 comprises a blend of CPET and HABMA. In this embodiment, the cap layer (PETG) may comprise approximately 10% and the core layer (CPET/HABMA) 14 may comprise about 90% of the total structure 10. This embodiment may or may not additionally include an additional oxygen barrier layer 12 and/or sealing layer 16.

In another embodiment, the cap layer comprises PCR and the core layer 14 comprises a blend of bio-PET homopolymer and PCR. The ratio of bio-PET homopolymer to PCR may be about 70:30. In this embodiment, the cap layer (PCR) may comprise approximately 10% and the core layer (bio-PET homopolymer and PCR) 14 may comprise about 90% of the total structure 10. This embodiment may or may not additionally include an additional oxygen barrier layer 12 and/or sealing layer 16. This embodiment may be considered made from 100% sustainable materials. The regrind from this embodiment may also be considered to be 100% sustainable.

In another embodiment, the sealing layer 16 comprises PCR, the core layer 14 comprises a blend of bio-PET homopolymer and PCR, and the oxygen barrier layer 12 comprises polyethyleneimine (PEI) emulsion. The ratio of bio-PET homopolymer to PCR may be about 70:30. In this embodiment, the sealing layer 16 (PCR) may comprise approximately 10% and the core layer (bio-PET homopolymer and PCR) 14 may comprise about 90% of the total structure 10, with the oxygen barrier layer 12 comprising a thin layer. This embodiment may be considered made from 99% sustainable materials. The regrind from this embodiment may also be considered to be 99% sustainable.

In an embodiment, one or more of the oxygen barrier layer 12, the core layer 14, and/or the sealing layer 16 may comprise a blend of PETG, PCR, and APET. In this embodiment, the PETG may comprise approximately 50% of the composition.

In an embodiment, the oxygen barrier layer 12 must meet oxygen resistance criteria, be compatible with the core layer 14, and be reusable (in the regrind) as an oxygen barrier. Accordingly, if HABMA is used in the oxygen barrier layer 12, some of the HABMA may find its way into the core layer 14 through regrind. Amounts of HABMA as small as 4.5% can reduce oxygen migration by 16%.

In an embodiment, the inventive layers of the composition are melt adhered to form a sheet 10 which exhibits the advantageous properties set forth herein. The sheet 10 may be of any weight or thickness, depending on its application but in one embodiment, may be approximately 12 mil thick. In another embodiment, the sheet 10 may be approximately 10-15 mil thick. In still another embodiment, the sheet 10 may be approximately 5-20 mil thick.

Figure 2:
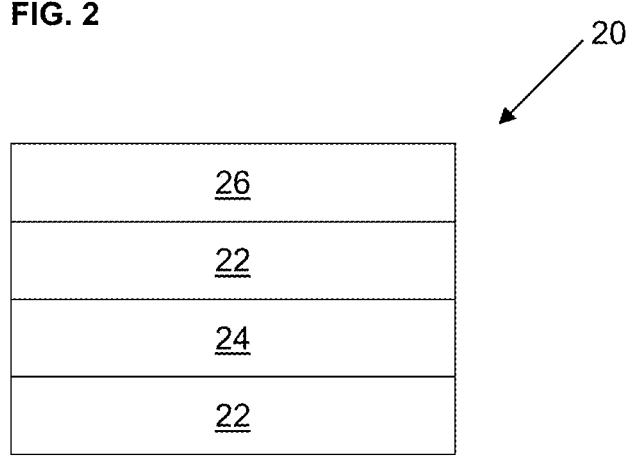
FIG. 2 illustrates a cross-sectional view of another embodiment of the inventive composition.

In another embodiment, shown in FIG. 2, the structure 20 may comprise a layered structure where in the oxygen barrier layer 24 is disposed between two functional core layers 22. In this embodiment the sealing layer 26 may be adjacent a first functional core layer 22. The opposite side of the first functional core layer 22 may be adjacent the oxygen barrier layer 24. The opposite side of the oxygen barrier layer 12 may then be adjacent a second functional core layer 22. The second functional core layer 22 may be adjacent the outside of the container. The sealing layer 26 may be adjacent the food product and may comprise the initial trim contact side of the structure 20. The composition of each layer may be as set forth above with respect to FIG. 1.

Figure 3:
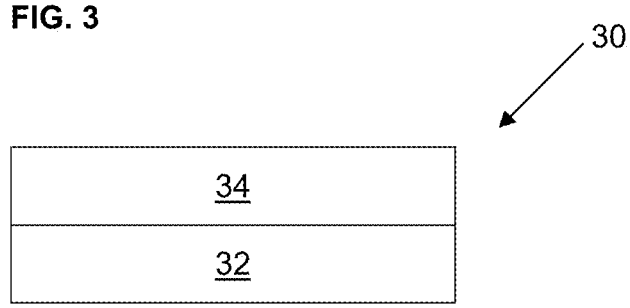
FIG. 3 illustrates a cross-sectional view of another embodiment of the inventive composition.

In still another embodiment, shown in FIG. 3, the structure 30 may comprise a layered structure comprising a functional core layer 32 and a sealant layer 34. In this embodiment, the functional core layer 32 may comprise one or more of the following: virgin PET resin, HABMA, PCR, one or more nucleating agents, regrind, colorant, and/or antioxidants. In an embodiment, the core layer 32 may include a compatibilizer. The core layer 32 may have the same or similar characteristics, properties, and benefits as those set forth above with respect to FIG. 1 or FIG. 2.

In an embodiment, the core layer 32 comprises a dilute blend of HABMA and a concentrated amount of PET, which together act as an oxygen barrier throughout the majority of the thickness of the structure 30, rather than having a separate oxygen barrier layer. In another embodiment, the core layer 32 comprises a standard or concentrated blend of HABMA and CPET. In this embodiment, the HABMA and CPET may be intermixed and the HABMA may comprise approximately 10% of the total composition (i.e. CPET may comprise about 90% of the total composition).

In an embodiment, the core layer 32 may contain components which are common to the sealing layer 34. In an embodiment, the core layer 32 may be receptive to direct melt adhesion to the sealing layer 34. Additional HABMA may find its way into the core layer through regrind. Even amounts of HABMA as small as 4.5% can reduce oxygen migration by 16%. The composition of the core 32 allows it to contribute to adhesion, strength, hot fill resistance, opacity, cost reduction with PCR, sustainability from PCR, and decomposition control beyond any individual components. The composition of the core layer 32 also maintains improved oxygen resistance over 100% PET. In an embodiment, the HABMA dries and extrudes similarly to PET.

In an embodiment of the invention, HABMA blends with PET to improve oxygen barrier characteristics without compromising PET properties. HABMA typically requires multidirectional stretching (such as obtained through blow molding) to ensure an acceptable oxygen transmission rate through a phenomenon known as strain induced crystallization (SIC). Blow molding avoids crystallization of PET to preserve transparency, but requires the crystallization of HABMA. In the formation of portion control containers, however, the packaging structure is uniaxially stretched, which limits SIC to a single direction, thus increasing the oxygen transmission rate as compared with blow molded structures.

Generally speaking, HABMA nucleates PET crystallization, which can speed the process to achieve hot fill capability; however PET can slow down the crystallization rate of HABMA, which is useful for optimal oxygen barrier performance. In an embodiment of the present invention, forced crystallization of the functional core layer 14, 22, 32 may be used to supplement these deficiencies (more fully discussed later). The process of forced crystallization helps to ensure that the materials blend and the final product will achieve the best performance possible.

The sealing layer 34, in this embodiment, may comprise any of the following: (a) APET; (b) CPET, (c) PETG, or (d) PCR. The sealing layer 34 may have the same or similar characteristics to those set forth above with respect to FIG. 1 or FIG. 2.

Optionally, an additional layer may be presented on the outside of the structure 10, 20, 30, which may be decorative or may provide an enhanced oxygen and/or moisture barrier.

Figure 8:
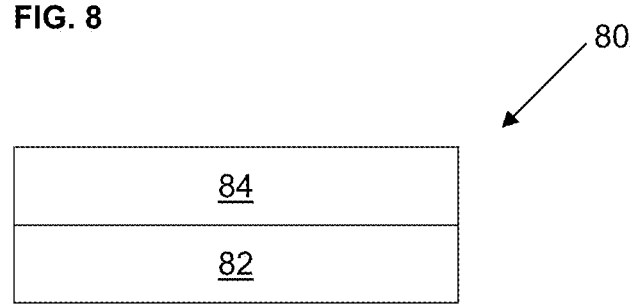
FIG. 8 illustrates a cross-sectional view of another embodiment of the inventive composition.

Polytrimethylene furandicarboxylate (PTF) is a biopolymer with oxygen barrier characteristics, which is heat sealable over a wide range of conditions, and which has an increased stiffness over that of PET. Additionally, PTF crystallizes in the presence of a nucleator, further improving oxygen barrier qualities. In an embodiment, shown in FIG. 8, the inventive composition 80 comprises a core layer 82 and a PTF layer 84. In this embodiment, the core layer 82 may comprise a mixture of CPET, PCR, and regrind with PTF, CPET, and PCR. The presence of CPET in the core layer 82 will ensure the container is hot fill capable to 100° C. The PTF layer 84 may be disposed on the food side of the core layer 82, in an embodiment.

In an embodiment, the PTF layer 84 comprises approximately 10% of the total composition 80. In an embodiment, the PTF layer 84 comprises approximately 10% to approximately 25% of the total composition 80. In another embodiment, the PTF layer 84 comprises approximately 25% of the total composition 80 and the core layer 82 comprises CPET. In an embodiment, the PTF layer 84 comprises approximately 10% to approximately 25% of the total composition 80 and the core layer 82 comprises a blend of CPET and HABMA.

In an embodiment, the core layer 82 and the PTF layer 84 are co-extruded without the need for a tie layer. In an embodiment, the PTF layer 84 may bond directly to the core layer 82.

In an embodiment, the PTF layer provides the requisite oxygen transmission resistance, broad heat seal range and improved stiffness. Additionally, in this embodiment, PTF is compatible in the melt with CPET, APET and PCR, preserves its original oxygen barrier performance, and adds stiffness to the final container. Thus, the regrind brings greater value than it would if it were not comprised of PTF.

In an embodiment, the PTF layer 84 may be melt compatible with and may be mixed with HABMA in various concentrations to form an oxygen barrier layer with quicker crystallization (optionally supported with nucleating additives) without the need for a compatibilizer. In some embodiments, PTF can be used to replace PVdC in food packaging. In an embodiment, the PTF layer 84 may comprise the sealing layer as discussed herein and/or the oxygen barrier layer as discussed herein.

In an embodiment, the method for making the packaging structure of the invention utilizes a co-extrusion process. In another embodiment, melt extrusion is utilized. In still other embodiments, adhesives may be used to adhere one dissimilar layer onto another. In a particular embodiment of the invention, the inventive materials, when combined via co-extrusion, obviate the need for adhesive layers, increase oxygen migration resistance, reduce the trim force required to cut the structure such that trim quality is improved, and/or withstand hot fill temperatures up to at least 180° F.

In some embodiments, the inventive composition can be foamed. This can be accomplished via Mucell® technology or conventional means. In some embodiments, the PET element used in the present invention may comprise PETlite. PETlite is a three-layer co-extruded structure of PET/PET foam/PET, which can be useful for applications which require lighter weight containers. Use of the term "PET," as used herein, may include use of PETlite, in some embodiments.

In various embodiments of the invention, crystallization techniques are utilized to improve various attributes of the inventive product. For example, crystallization may add strength to a PET-containing product and may increase the service temperature to allow for hot filling (for example, up to 190° F.) of food into the tray without undue deformation resulting from the heat. The need for a crystallizer device is obviated by the partial crystallization of the PET core layer using the methods of this invention.

In a particular embodiment of the invention, PET is partially crystallized in a manner which preserves the ability to add a barrier layer and also to remove that barrier layer prior to reprocessing, as certain barrier components are not compatible with PET during the reprocessing of scrap. In one embodiment, the process requires use of a barrier laminate as opposed to a co-extruded barrier layer. In this embodiment, the laminate may be affixed to the PET core layer after a partial or significant amount of the crystallization process is completed.

Figure 4:
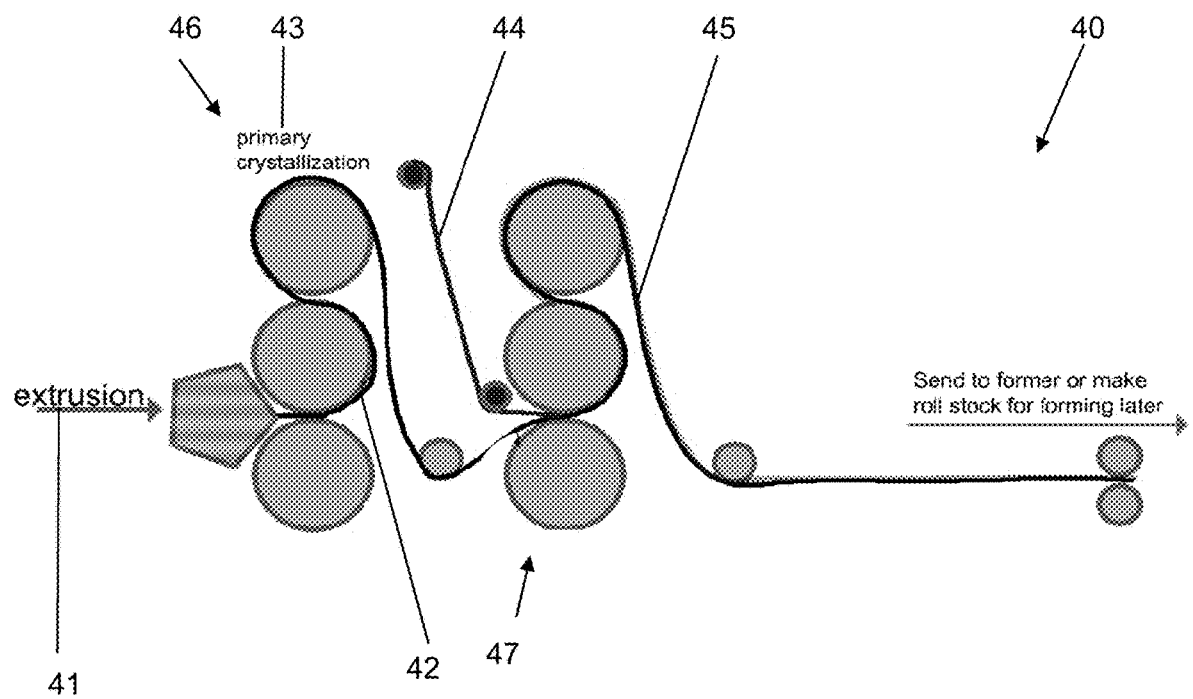
FIG. 4 illustrates a diagram of a method of the invention in one embodiment.

FIG. 4 illustrates an embodiment of the crystallization process 40 of the present invention. In this embodiment, the PET layer is initially extruded 41 between the rolls of a first roll stack. The PET layer may be co-extruded 41, in some embodiments, with a PCR layer. The PCR may help to prevent over-crystallization in some embodiments, which can result in brittleness. In a particular embodiment a PET homopolymer may be combined with talc. In a more particular embodiment, 1% of 1 μm talc may be added to a 60% PET homopolymer, which may be co-extruded with a 40% PCR layer. Talc may aid in crystallization control, which is balanced against impact modification. In an embodiment, a terpolymer or other impact modifier, such as, for example, EMA-glycidyl ether terpolymer (optionally at 3%) may be added to either layer. This may ensure some brittleness resistance, but should not form impact resistant particles, which can interfere with foam quality. In another embodiment, APET may be added to either layer.

In an embodiment, a PETlite sheet may be utilized. In this embodiment, the non-foam PET layers may be combined with PCR and the foam PET layer may be combined with APET or may comprise PET copolymer (APET).

In an embodiment, the extruded sheet 42 is then treated with an initial, primary crystallization process 43 at a first roll stack 46. In an embodiment, the PET extruded or co-extruded sheet 42 may be crystallized at the first roll stack up to approximately 10% crystallization. In an embodiment, the PET extruded or co-extruded sheet 42 may be crystallized at the first roll stack up to approximately 14% crystallization. The crystallization may occur in the core layer or in any cap layer (i.e. sealing layer) that is co-extruded with the core layer. In an embodiment the majority of the crystallization occurs in the cap layer. The crystallization process may comprise any crystallization process known in the art. This crystallization is a partial crystallization, conducted prior to lamination.

The sheet 42 is then passed to a second roll stack 47 and is passed between the two stacked rolls 47 with a barrier laminate 44 to form a laminated sheet 45. In an embodiment, the barrier laminate layer 44 may comprise a mixture of polyethylene (PE) and Bynel adhesive, or any other adhesive known in the art. In an embodiment, the bond strength between the extruded sheet 42 and the laminated sheet 45 is sufficient such that the layers adhere to one another for practical utility, but can still be removed easily at a later time, prior to reprocessing. In an embodiment, the laminated sheet 45 may be oriented slightly, which may add column strength.

In an embodiment, the temperature of the PET sheet and the laminate layer are approximately the same at the time of lamination. In an embodiment, 30-inch diameter chrome rolls are utilized in the method. If a releasable laminate is used and chrome rolls are used, the temperature of the second set of chrome rolls 47 involved in the lamination should not exceed the melting point of the laminate components. In an embodiment, the second set of chrome rolls 47 involved in the lamination are at a lower temperature than the first roll stack 46 involved in the crystallization process.

In an embodiment, the method may involve winding the rolls at approximately 40 ft/min, which provides a 15-second crystallization residence time for a single stack. In an embodiment, the method may involve winding the rolls at approximately 225 ft/min, which provides a 2.7×2 or 5.4-second crystallization residence time for two stacks. The temperature of the first roll stack wherein the crystallization occurs may be between about 240° F. and 270° F. Any speed, time, and temperature combination known in the art which achieves up to about 10% crystallization may be utilized, however. In an embodiment, the use of two chrome roll stacks provides more flexibility for line speed operation and crystallization control. In embodiment, the use of the chrome rolls may ensure that the product will maintain a flat and uniform thickness across the sheet which is important for ultimate tray quality.

In an embodiment, the core and/or cap is crystallized before the composition is dried. This element of the process may help to avoid agglomeration at drying temperatures of up to 300° F. In an embodiment, the inventive crystallization process improves the drying capability of the PET product once recovered and reused in the manufacturing process. In an embodiment, the crystallization process provides an ideal balance of stiffness and brittleness, which is critical to end use.

In an embodiment, the inventive layered sheets (i.e. the laminate discussed above, in an embodiment), may be molded into trays from flat bed forms. The typical molding process takes approximately 5 to 8 seconds. In an embodiment, the molding process utilized herein takes approximately 3 to 6 seconds. In addition, the standard drying process often requires using temperatures below 300° F. in order to prevent agglomeration. This slows the manufacturing process down, as more drying time may be required at the lower temperature to achieve a commercially acceptable moisture level. At the same time, excessive crystallinity of the sheet can prevent acceptable forming. Crystallinity of over 17% at the time of forming may make the sheet heat resistant and difficult to form. In an embodiment of the invention, the cycle and drying time may be decreased with an inventive method, without sacrificing or creating excessive crystallinity.

The inventive process may be performed on a single stack of chrome rollers. In a first embodiment of this process, Stage 1 may comprise a polish step, wherein the PET sheet is polished with the chrome roll. The chrome roll may be run at as high a temperature as possible without the sheet sticking thereto. In Stage 2, an inventive chrome roll with a non-stick coating may be used. This second chrome roll may be run with oil heating to about 250° F.

Alternatively, in a second embodiment of this process, Stage 1 may comprise use of a single stack chrome roll with a non-stick coating. This chrome roll may be run with oil heating to about 270° F. Stage 2 of the process may comprise quenching the sheet with a chrome roll, wherein the chrome roll may be run at as high a temperature as possible without the sheet sticking thereto.

Using these processes, a sheet of approximately 9.5% starting crystallinity may be crystallized up to about 15%. The oven adds another 1% of crystallization, thus making the total 16% crystallinity prior to molding. The trays then need to be crystallized only another 2-5% to meet ovenability requirements of greater than or equal to 18%. The forming platen may increase the crystallinity by about another 2% to 3.5%, in an embodiment. In this embodiment, a crystallinity of greater than or equal to about 18% may be achieved in the trim scrap without additional crystallization of the trays. In an embodiment, 20% to 30% crystallinity in the final product is achieved via the processes discussed herein. Such crystallinity is sufficient to withstand 300° F. and higher drying temperatures without agglomeration. The higher drying temperatures may mitigate material degradation from moisture, providing additional benefits.

Many PET coatings cannot survive thermoforming without cracking or otherwise losing their oxygen ingress resistance and/or cannot be reprocessed back into the melt process as a regrind. In an embodiment of the invention, foamed or unfoamed PET may be coated with Michelman® Michem® Flex Barrier (MFB3510) or a polyethylene imine, using gravure or Meyer rod (or other) coating processes to a thickness of under 10 µm, or in another embodiment to a thickness of under 5 µm, or in still another embodiment to a thickness of under 1 µm. In a particular embodiment, the thickness for the coating is between about 0.1 µm and 1.0 µm. In another embodiment, the thickness for the coating is between about 0.2 µm and 0.5 µm. In still another embodiment, the thickness of the coating may be between about 0.25 µm and about 0.75 µm. In another embodiment, the thickness of the coating may be about 0.50 µm.

In an embodiment, no primer is required for the coating. The coated sheet may then be thermoformed such that the coating is on the outside of the container—i.e. the side of the container that is not in contact with food. This coating may provide additional oxygen barrier properties to the final product without substantial cracking or loss of oxygen ingress resistance during thermoforming processes. Additional benefits may include the fact that this coating can be easily removed with water or abrasion after the thermoforming or trimming cycle, but prior to recycling, if desired. Alternatively, this coating can remain on the product while reprocessed as regrind without compromising the quality of the PET. Accordingly, this coating provides a very flexible improvement.

Because MFB3510 is a water-based coating, it can be used without the need for solvent handling/control measures. In an embodiment, MFB3510 is more effective than and may replace PVdC coatings (and can be used at a lower coating thickness, up to about 10 times lower) in various products and processes.

In an embodiment, the oxygen transmission rate using the coating may be equal to or less than about 0.007 cc oxygen per package per day at 21% oxygen or less when formed. In another embodiment, the oxygen transmission rate using the coating may be between about 0.0006 cc and about 0.0022 oxygen per package per day at 21% oxygen or less when formed.

In one embodiment, the MFB3510 coating may be applied as a flood coat (i.e. with 100% or full coverage). In another embodiment, the MFB3510 coating may be applied in a pattern to a sheet or package. The pattern application may be applied via a gravure roll or any other method known in the art. In an embodiment, the pattern-applied coating will be disposed on the trim scrap as well as the container portions of the sheet. The pattern-applied coating may provide the benefits discussed herein without exceeding the desired oxygen transmission rate.

In an embodiment, a PET-based sheet may be coated in a pattern of partial coverage with MFB3510. Any pattern known in the art may be utilized and no alignment of coated locations to the molds is necessary. In an embodiment, the pattern is repeated throughout the sheet or package. In an embodiment, the pattern may comprise repeating dots, stars, stripes, circles, triangles, squares, rectangles, linear lines, non-linear lines, curves, waves, or anything of the like. In an embodiment, the pattern covers at least approximately 50% of the sheet or package surface. The thickness of the coating can be adjusted based upon the coverage percentage, in order to achieve commercially acceptable results. I.e. if a pattern is thinner, the pattern would need to cover more of the sheet. The thicker the pattern, the lower the required coverage of the pattern.

Figure 6:
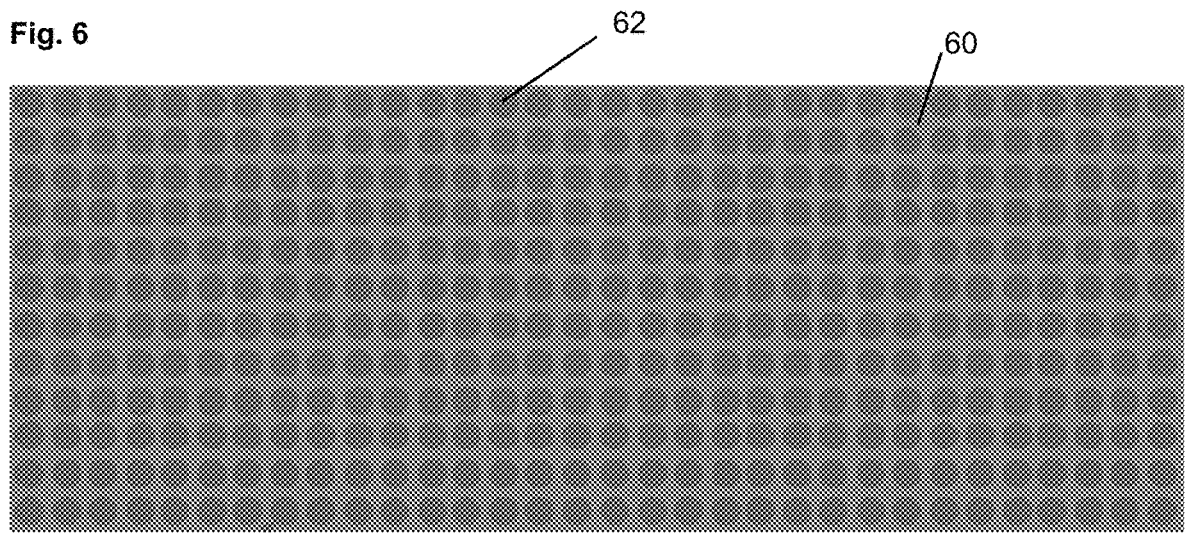
FIG. 6 illustrates top view of a coating pattern in one embodiment of the inventive composition.
Figure 7:
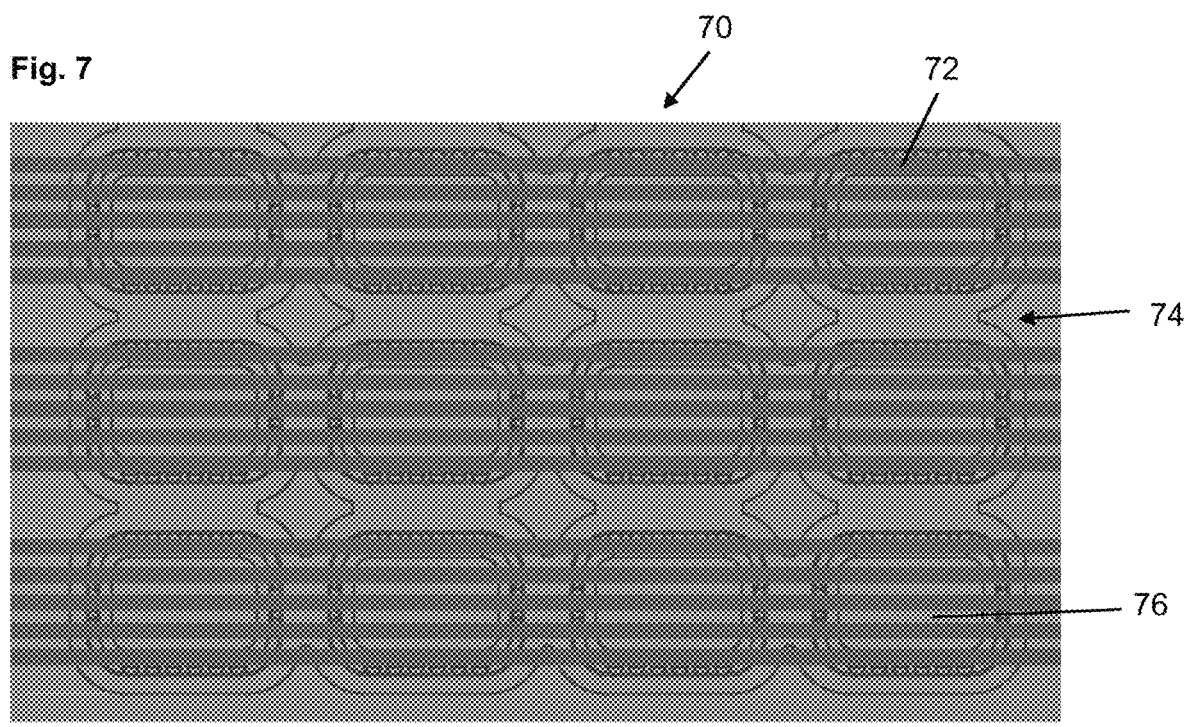
FIG. 7 illustrates top view of a coating pattern in another embodiment of the inventive composition.

FIG. 6 provides one embodiment of the patterned coating application on a sheet 60 of PET-based material. In this embodiment, the coating pattern comprises repetitive dots 62. FIG. 7 provides an alternate embodiment of the patterned coating application on a tray 70. In this embodiment, the pattern comprises stripes 72, but is not disposed in the horizontal boundaries 74 between cups 76 within the tray 70. In a similar embodiment, the pattern may comprise stripes, but the stripes may not be disposed within the vertical boundaries between cups within the tray or may not be disposed between either of the horizontal or vertical boundaries between cups. In an embodiment, the stripes will avoid the boundaries between cup arrays in the machine direction but not in the transverse direction. In these embodiments, the coating is not wasted on the boundary areas and the trim scrap has less coating thereon.

Figure 5:
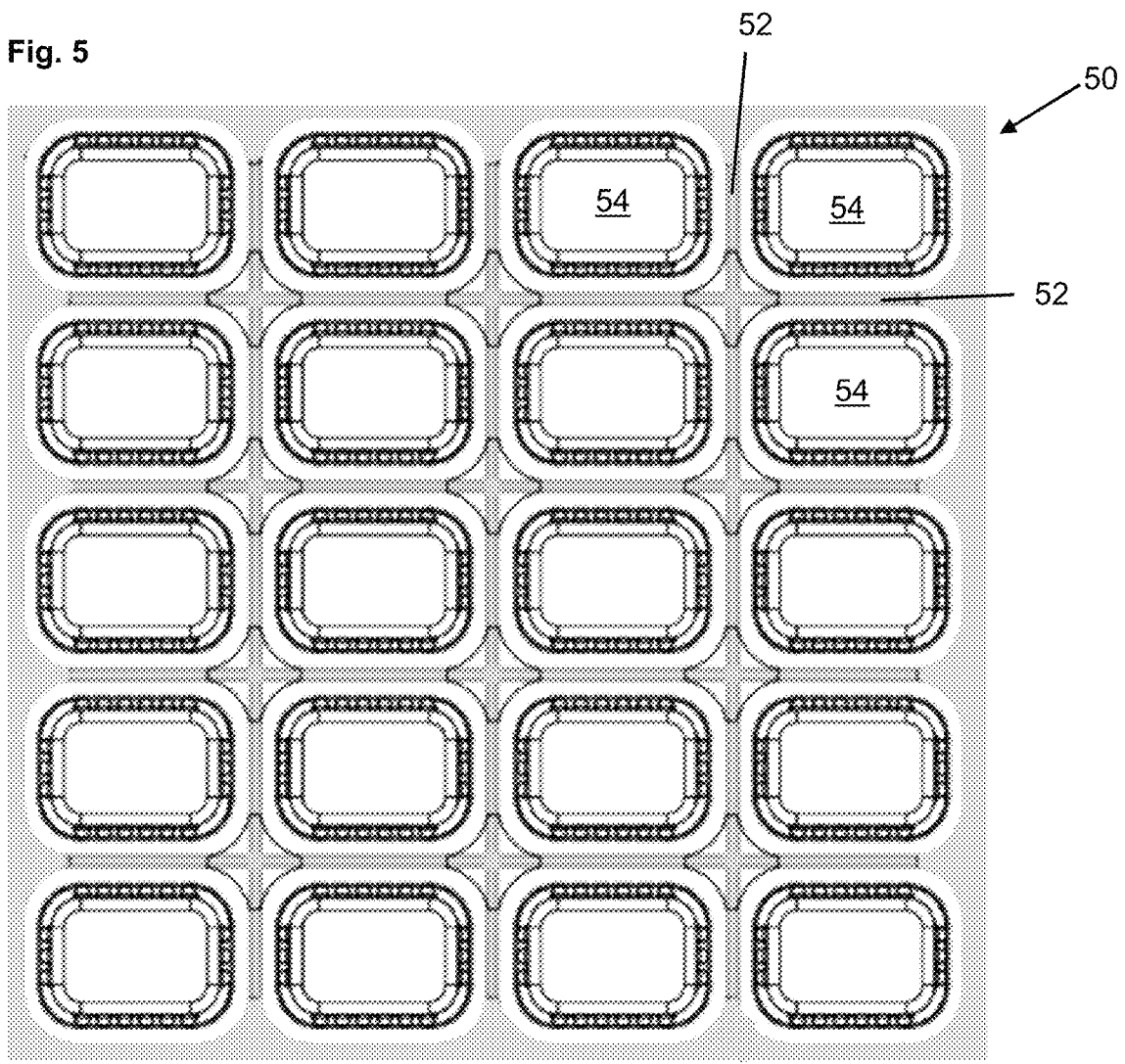
FIG. 5 illustrates a top view of a tray in one embodiment of the invention.

In an embodiment, the PET-based sheets discussed herein are formed into trays, as shown in FIG. 5. These trays may be interconnected portion control trays, in an example embodiment. The tray may be provided to a food product provider in the shown form and the food product provider may be required to fill, seal, and then trim the trays into individual containers of the food product which can be sold or otherwise provided to the consumer. Some materials, such as PET, may be difficult to trim. In such cases, cuts can be incomplete or otherwise imprecise, causing fragments of the tray to potentially contaminate the food product compartments and/or cause process interruptions. In an embodiment, the invention provides a tray which is easier to trim, reducing or eliminating these concerns.

In this embodiment, the tray 50 is provided with molded channels 52 located between each food product compartment 54. The food product compartment 54 may be a cup, bowl, or other container. In an embodiment, the channels 52 are formed into the back side or the underside of the tray (i.e. the bottom side of the product container, opposite the food contact surface). In an embodiment, the channels 52 are formed at the time the tray 50 is formed. In another embodiment, the channels 52 are formed after formation of the tray 50. In an embodiment, the channels 52 have a reduced thickness as compared to the remainder of the tray 50, as they are stretched from a flat formation to a channeled formation during manufacture. In an embodiment, the channels 52 may be easier to trim due, in part, to the reduced thickness of the material.

In this embodiment, the channels 52 will not interfere with the process of sealing one or more film lids onto filled trays 50 due to their location on the underside of the tray. In an embodiment, the channels 52 are provided between each vertical and horizontal division of one food container 54 and its adjacent food container 54. The channels 52 may, in an embodiment, be about 0.005 inches deep, but the channels 52 can be deeper or shallower depending on how much trim force reduction is required for the particular tray. The tray is registered for the filling, sealing and trimming processes. The registration aligns the channels 52 with the trim knives used in the trimming process.

In one embodiment, the channels 52 may extend the entire length or substantially the entire length of the tray 50. In another embodiment, the channels 52 may divide each container 54 from its adjacent container 54, but the channel 52 may be discontinuous across the length or width of the tray 50. For example, the channel 52 may be discontinuous at or near the intersection of four adjacent containers 54. The embodiment shown in FIG. 5 illustrates vertically and horizontally aligned containers 54 and channels 52, but it should be understood that any configuration known in the art may be utilized.

In an embodiment, the cross-section of each channel 52 may be semi-circular. In other embodiments, the cross-section of each channel 52 may be triangular, square or any other shape known in the art. The channel 52 may be disposed upwardly or downwardly, as related to the tray 50 top surface.

The width of the channels 52 may be varied based upon the size and configuration of trimming equipment. In an embodiment, the use of perforations in place of the channels would be disadvantageous because perforations may cause jagged edges on the final product. The use of the inventive channels 52, however, results in smooth trimmed edges.

In another embodiment, the tray 50 may be formed with a partial notch cut into the tray, between each compartment 54, on the bottom side of the tray 50. In an embodiment, the notch can be created by partially cutting into the tray 50, between cups 54, using existing trim press tooling. The notch may create a weakened portion of the tray 50, which is able to be trimmed after fill and seal with lesser force. The notches may, in an embodiment, be about 0.005 inches deep, but the notches can be deeper or shallower and can be any width, depending on how much trim force reduction is required for the particular tray. In an embodiment, the notches may direct the trim knife to the proper trim location, additionally improving the accuracy of the trim. In an embodiment, the notches may be easier to trim due, in part, to the reduced thickness of the material in the position of the notch.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

EXAMPLE 1

Materials:

Post-consumer resin (PCR) PET provides the primary substrate. It is beneficial for cost control, stiffness and sustainability of the final product. PCR PET comprises the balance of the materials, on a percentage basis by weight, after the below materials are added. In an embodiment, the PCR PET comprises between about 52.7% and 72.7% of the materials, by weight. In an embodiment, the PCR PET is green or colorless. In an embodiment, the PCR PET is a flake or pellet product.

Polypropylene (PP) is provided at approximately 5 to 30%, by weight. The PP is beneficial for the water vapor transmission rate (WTR), reduces trim force, and dampens the green coloration (if green PCR PET is used) so that the white color specification can be met. In an embodiment, the PP is provided as approximately 15% by weight of the composition. In an embodiment, the PP is provided as approximately 19% by weight of the composition. In an embodiment, the PP is provided as approximately 15% to approximately 20% by weight of the composition.

Figure 11:
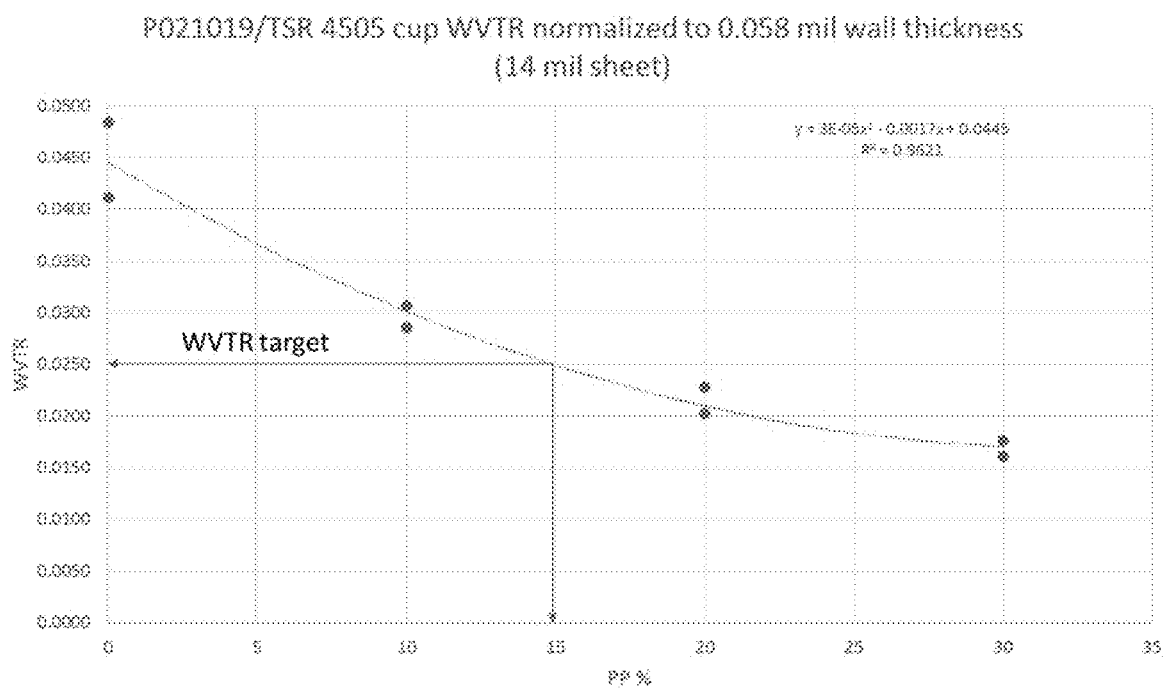
FIG. 11 is a chart which illustrates the water vapor transmission rate of various samples of the invention.

Note that FIG. 11 illustrates the water vapor transmission rate (WVTR) of various samples of inventive portion control cups, wherein the amount of polypropylene is varied. As can be seen, the target WVTR rate is met by cups having approximately 15% polypropylene (or greater percentages of PP). Thus, in an embodiment, the inventive composition may contain PP in an amount which is greater than 15% by weight. In another embodiment, the inventive composition may contain PP in an amount which is between about 15% and 30%, by weight.

Ethylene methyl acrylate (EMA) is provided at approximately 10% by weight. In an embodiment, the EMA is the impact modifier.

Ethylene/methyl acrylate/glycidyl methacrylate terpolymer (EMA-GMA) is provided at approximately 1.7% by weight. In some embodiments, EMA-GMA is provided at between about 1% and about 2% by weight. EMA-GMA may control the EMA particle size. In other embodiments, EMA-GMA may also control other particle sizes, such as that of MXD6, if included. Additionally, the EMA-GMA may compatibilize incoming process regrind.

Blue-white $TiO_2$ color concentrate is provided at approximately 5.6%, by weight. In some embodiments, the blue-white $TiO_2$ color concentrate is provided at approximately 5% to about 6%, by weight.

Figure 9:
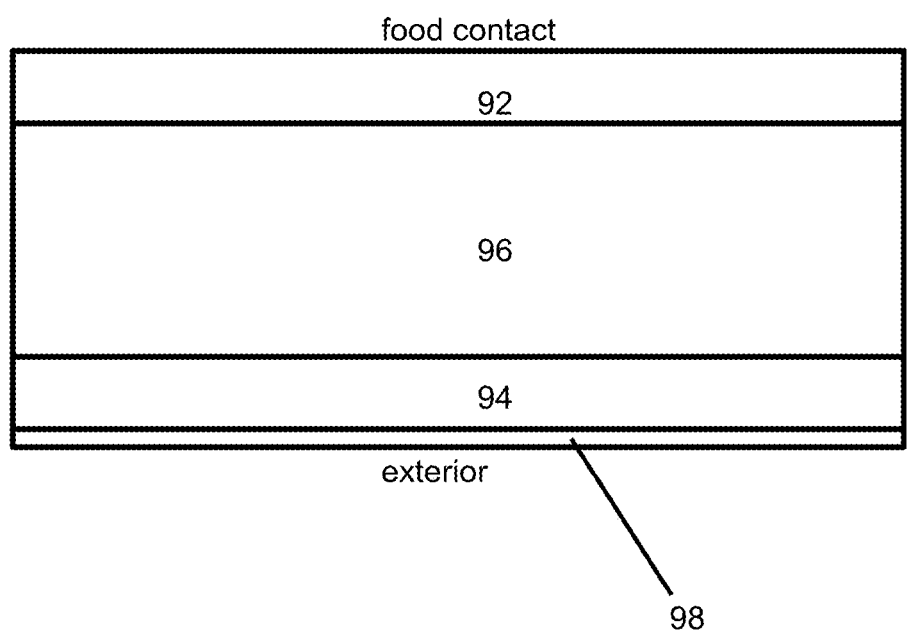
FIG. 9 illustrates a cross-sectional view of yet another embodiment of the inventive composition.

Coating: Michelman® MFB 3510 PEI.
Structure (see FIG. 9):

In this example, an A/B/A coating co-extruded structure was formed. The 'A' layers sandwich the 'B' layer. As shown in FIG. 9, layers 92 and 94 comprise 'A', as set forth below, and layer 96, the core layer, comprises the components set forth below as 'B'.

A=virgin, cleaned PCR plus 5.6% blue-white color concentrate.

B=the above-listed materials (PCR PET, PP, EMA, EMA-GMA, blue-white $TiO_2$ color concentrate).

The coating 98 is provided as an oxygen barrier and disposed on the outside/exterior of the container.

The outer layers 'A', also referred to herein as cap layers, 92, 94 have at least three functions: 1) meet color specifications, 2) the food side 'A' layer 92 improves seal and peel properties, and 3) the food side 'A' layer 92 acts as a functional barrier to the migration of container chemicals into the food.

The core layer 'B' 96 has also multiple functions: 1) meet WVTR specifications, 2) provide impact resistance, 3) control trim force, 4) compatibilize process regrind, 5) control cost, 6) control stiffness, and 7) provide much of the sustainable material.

The Michelman® PEI coating 98 provides an oxygen barrier in a thermoforming platform that can be re-melted and reprocessed back into trays.

Process:

A thermoformer was used to form the portion control trays.

Results:

Table 1 illustrates a comparison of the present invention (Column A) versus a standard impact modified PET (Column B) and a HIPS composition (Column C).

TABLE 1

|  | A<br>Non-<br>Crystallized<br>Inventive Cups | B<br>Non-Crystallized<br>Std PET + impact<br>mods | C<br>HIPS<br>844E |
| --- | --- | --- | --- |
| Sheet thickness (mil) | 14 | 14 | 15 |
| PP | 20% | 0 | NA |
| impact mods | 11.70% | 11.70% | NA |
| Blu-Wht colorant | 5.60% | 5.6% | NA |
| PCR PET | 62.70% | 85.30% | NA |
| Michelman ® MLB 3510 | 0.5 lbs/ream | 0.5 lbs/ream | 7 lbs/ream PVdC |
| tensile psig; no spec | 5,500 | 7,000 | 2500 |
| puncture force (grams) | 450 | 800 | 450 |

TABLE 1-continued

|  | A<br>Non-<br>Crystallized<br>Inventive Cups | B<br>Non-Crystallized<br>Std PET + impact<br>mods | C<br>HIPS<br>844E |
|---|---|---|---|
| OTR 21% O2; spec = 0.007 | 0.007 | 0.007 | 0.007 |
| WVTR; Spec = 0.025 | 0.025 | 0.045 | 0.025 |
| each cap layer thickness in mil | 1 | 1 | NA |

As noted in Table 1, the inventive composition A provided a puncture force of 450 grams (equivalent to that of HIPS). The target puncture/trim force is approximately 442 grams. Thus, the inventive composition was found to be satisfactory in terms of trim force. The target WTR is approximately 0.025 g/pkg/day. As is noted in Table 1, the WVTR of the inventive compsition was 0.025 g/pkg/day (equivalent to that of HIPS), at the target rate.

The inventors surprisingly found that the inventive composition had a softer feel than the comparative products set forth in columns B and C.

Table 2 illustrates the water vapor transmission rate of the inventive composition, as compared to a control sample. The control sample comprises impact modified PET without a coating. The inventive samples are each comprised of the composition set forth in Example 1. Each of the inventive sample sheets (variables 2-7) had water vapor transmission rates which were lower than that of the control sample, a marked improvement.

TABLE 2

| Sheet WVTR (g/100 in²/day @ ~37.8° C./90% RH) | | | | | | | |
|---|---|---|---|---|---|---|---|
| Replicate # | Control | Variable 2 | Variable 3 | Variable 4 | Variable 5 | Variable 6 | Variable 7 |
| 1 | 0.31 | 0.19 | 0.23 | 0.27 | 0.18 | 0.21 | 0.24 |
| 2 | 0.31 | 0.19 | 0.23 | 0.27 | 0.18 | 0.21 | 0.24 |
| Mean | 0.31 | 0.19 | 0.23 | 0.27 | 0.18 | 0.21 | 0.24 |

Figure 10A:
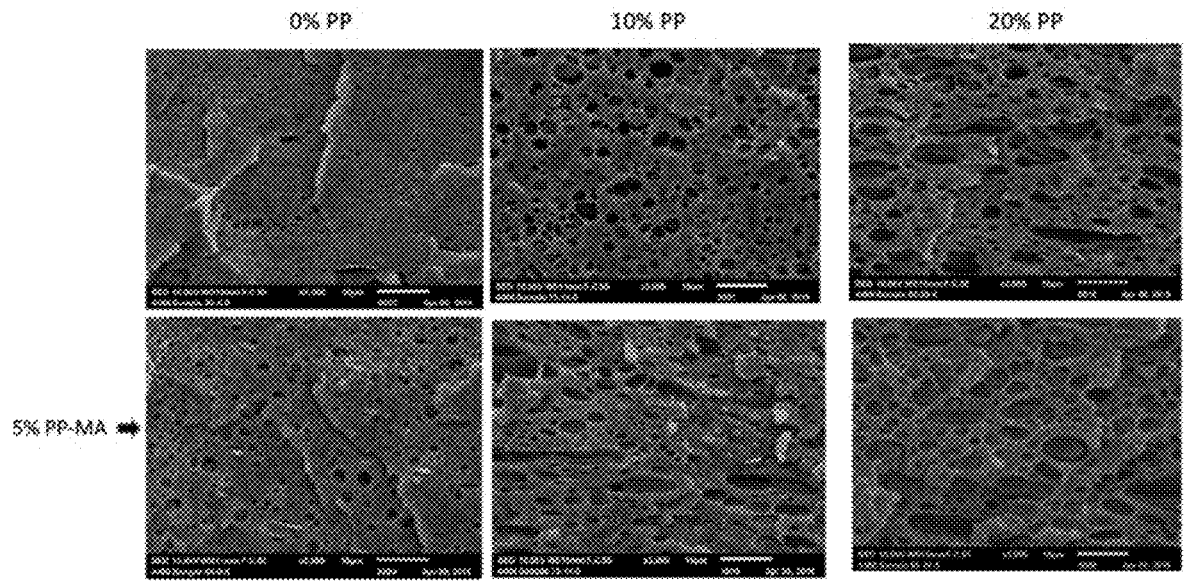
FIGS. 10A-10B illustrate scan electron microscopy images of the invention, in an embodiment.
Figure 10B:
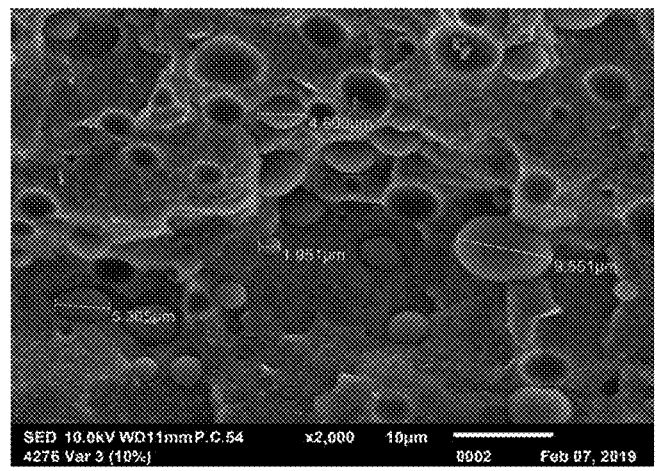

FIG. 10 illustrates scan electron microscopy images showing PP particles in a PET matrix. FIG. 10A illustrates various compositions with varying percentages of PP and with (bottom images) and without (top images) compatibilizer. The goal image is a matrix with particles of relatively uniform size. As can be seen in FIG. 10B, in an inventive embodiment using PP in a weight percentage of 10%, the PP particle sizes range from about 1.951 μm to about 9.551 μm and are considered relatively uniform.

EXAMPLE 2

Materials:

Post-consumer resin (PCR) PET provides the primary substrate. PCR PET comprises the balance of the materials, on a percentage basis by weight, after the below materials are added. In an embodiment, the PCR PET comprises between about 40.7% and 67.7% of the materials, by weight. In an embodiment, the PCR PET comprises between about 40% and 70% of the materials, by weight. In an embodiment, the PCR PET is green or colorless. In an embodiment, the PCR PET is a flake or pellet product.

Polypropylene (PP), provided as approximately 5 to 30%, by weight. In an embodiment, the PP is provided as approximately 15% by weight of the composition. In an embodiment, the PP is provided as approximately 19% by weight of the composition.

Ethylene methyl acrylate (EMA), provided as approximately 10% by weight. In an embodiment, the EMA is the impact modifier.

Ethylene/methyl acrylate/glycidyl methacrylate terpolymer (EMA-GMA), provided as approximately 1.7% by weight.

Blue-white $TiO_2$ color concentrate, provided as approximately 5.6%, by weight.

Polypropylene maleic anhydride copolymer (PP-MA), provided as approximately 5% by weight of the composition. PP-MA may serve as a PP compatibilizing agent and a trim force reduction agent.

In some embodiments, MXD6 provided as approximately 7%, by weight of the composition. The MXD6 provides an oxygen barrier.

Coating: Michelman® MFB 3510 PEI.

Structure (see FIG. 9):

In this example, an A/B/A coating co-extruded structure was formed. The 'A' layers sandwich the 'B' layer. As shown in FIG. 9, layers 92 and 94 comprise 'A' and layer 96, the core layer, comprises the components set forth below as 'B'.

A=virgin, cleaned PCR plus 5.6% blue-white color concentrate

B=the above-listed materials (PCR PET, PP, EMA, EMA-GMA, blue-white $TiO_2$ color concentrate, PP-MA, MXD6 (in some embodiments))

The coating 98 is provided as an oxygen barrier and disposed on the outside/exterior of the container.

The layers 92, 94 have at least three functions: 1) meet color specifications, 2) layer 92 improves seal and peel properties, and 3) layer 92 acts as a functional barrier to the migration of container chemicals into the food.

The core layer 96 has also multiple functions: 1) meet WVTR specifications, 2) provide impact resistance, 3) control trim force, 4) compatibilize process regrind, 5) control cost, 6) control stiffness, 7) provide much of the sustainable material, and 8) due to the presence of MXD6 in some embodiments, this layer may provide an oxygen barrier.

The Michelman® PEI coating 98 provides an oxygen barrier in a thermoforming platform that can be re-melted and reprocessed back into trays.

Process:

The inventive product was crystallized with only a single cooling mold present. The sheet was crystallized to 21-23% (by DSC) and then formed into a cooling mold. A forming oven was used with 30 seconds residence time. The sheet had a 21-23% crystallization content, was formable, and was resistant to 180° F.

As an alternative, if the oven residence time is shorter than 30 seconds, a flash crystallization process with 7% MXD6 may be utilized. In an embodiment of the invention, a flash crystallization process may be utilized. In this embodiment, an oxygen barrier may develop after as little as 10 seconds in a 280° F. oven, resulting in approximately 10% crystallinity. If residence time in the 280° F. oven is increased to 15 seconds, crystallinity may be improved to approximately 13%. If residence time in the 280° F. oven is increased to 20 seconds, crystallinity may be improved to approximately 21%. Between about 15 and 20 seconds, WTR may develop and may improve for at least 10 seconds after 21-24% crystallinity is achieved.

Results:

Table 3 illustrates various inventive compositions, shown in columns A-D, as compared with the HIPS composition. The composition shown in Column C, however, was not in the goal range for puncture force. Accordingly, PP was added to the composition to improve puncture force, which can be seen as successfully within the range for puncture force, in Column D.

TABLE 3

| | A<br>Crystallized cups from 14 mil sheet with coating | B<br>Crystallized cups from 14 mil sheet with MXD6 | C<br>Non: Crystallized Std PET | D<br>Non-Crystallized Std PET w/ PP | E<br>HIPS 844E |
|---|---|---|---|---|---|
| sheet thickness mil | 14 | 14 | 14 | 14 | 15 |
| PP | 5% | 5% | 0 | 15% | NA |
| impact modifier | 10% | 10% | 10% | 10% | NA |
| compatibilizer | 2% | 2% | 2% | 2% | NA |
| Blu-Wht colorant | 5.6% | 5.6% | 5.6% | 5.6% | NA |
| PCR PET | 79.4% | 72.4% | 84.4% | 69.4% | NA |
| MXD6 | 0 | 7% | 0 | 0 | NA |
| Michelman ® MLB 3510 | 0.5 lbs/ream | NA | 0.5 lbs/ream | 0.5 lbs/ream | 7 lbs/ream PVdC |
| Ultimate tensile strength (psig) | 7900 | 7900 | 6900 | 5500 | 2500 |
| Puncture force (grams) | 735 | NA | 620 | 450 | 450 |
| OTR 21% $O_2$; spec = 0.007 | 0.007 | 0.007 | 0.007 | 0.007 | 0.007 |
| WVTR; Spec = 0.025 | 0.025 | 0.025 | 0.045 | 0.025 | 0.025 |
| each cap layer thickness in mil | 1 | 1 | 1 | 1 | NA |

Based upon the above results, in an embodiment, the inventive composition may comprise the following components in the varied ranges, by weight:
 PP: between about 5% and 15%.
 Impact modifier: about 10%.
 Compatibilizer: about 2%.
 Colorant: about 5.6%.
 PET PCR: between about 65% and about 85%, or between about 69% and about 80%, or between about 69% and about 79%, or between about 69% and about 72%.

Polyamides produced from m-xylenediamine, such as MDX6, may optionally be used. Alternatively, or additionally, a PEI coating may be used.

Figure 13:
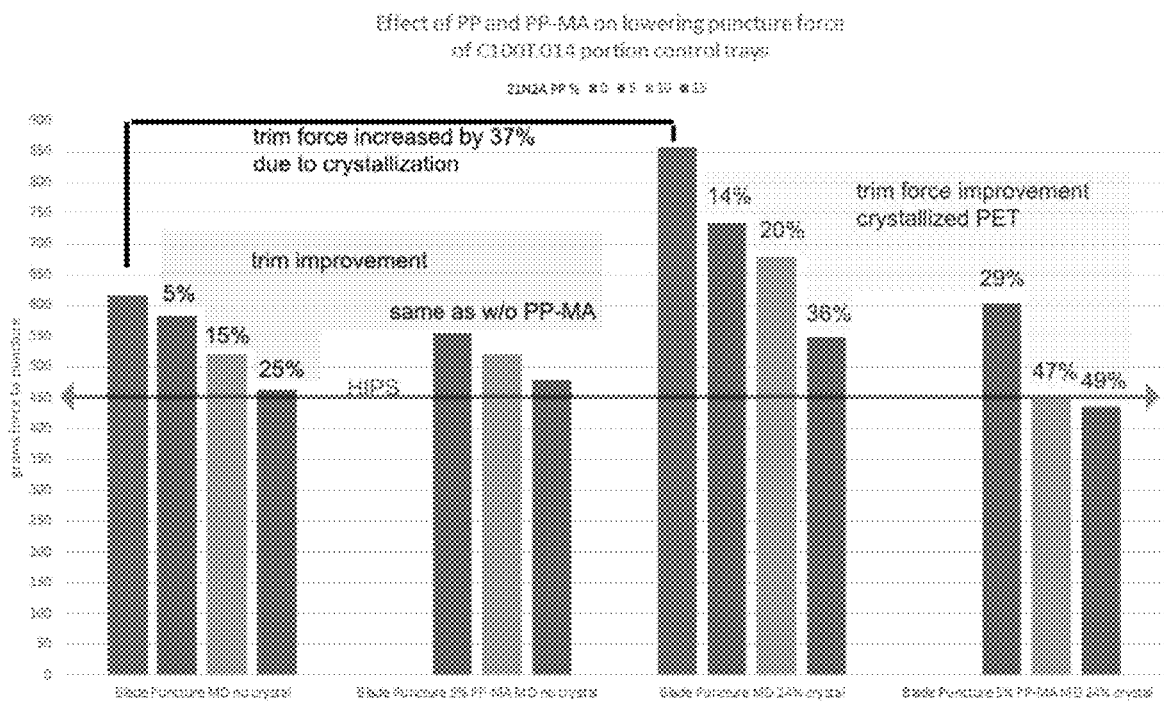
FIG. 13 is a chart which illustrates the effect of PP and PP-MA on lowering the puncture force in an embodiment of the invention.

FIG. 13 illustrates the effect of PP and PP-MA on lowering the puncture force in portion control trays. As can be seen, the trim force is increased by about 37% due to crystallization in the tray. Thus, in some embodiments, a non-crystallized embodiment of the invention may be preferable.

The samples which contained PP at 5%, 10%, or 15% each showed greater improvement, respectively, in puncture force (i.e. less force required), for both crystallized and non-crystallized samples. By adding PP-MA to the non-crystallized samples, the trim improvement (i.e. decrease in puncture force) was not substantially significant—that is, the resulting puncture force was nearly the same as was seen in those samples that did not contain PP-MA. Thus, it may not be necessary to utilize both PP and PP-MA in non-crystallized embodiments of the invention. However, in the crystallized embodiments (24% crystallized PET), adding PP-MA to the samples contributed to a significantly lower required trim force. Thus, for crystallized embodiments of the invention, it may be beneficial to include both PP and PP-MA to improve trim force requirements.

In an embodiment, PE could be added to the cap layers to improve WVTR, trim force and provide optimal heat seal performance. Likewise, the food side 'A' layer 92 could be thickened to at least 1 mil and the exterior 'A' layer 94 could be similarly thinned to ensure approximately 1 mil of layer 'A' between the core layer 96 and the food product. In an embodiment, the polyolefin dispersability could be improved to maximize WVTR, trim force and sealing as well as stiffness.

In another embodiment of the invention, post-consumer resin PCR PET may be combined with HDPE PCR in the core layer. In an embodiment, the combined PCR PET and HDPE PCR may be additionally combined with one or more of EMA, EMA-GMA, blue-white $TiO_2$ color concentrate, PP-MA, and/or MXD6. In an embodiment, HDPE PCR may be utilized in the core layer and the core layer may not contain polypropylene.

In an embodiment, PCR PET may be provided as about 47.5%, by weight (38% by volume) and may be combined with HDPE PCR at about 47.5%, by weight (57% by volume). PE-GMA (AX8840 Arkema) may be included as about 5% by weight (5% by volume). In an embodiment, the PE-GMA may be provided as between about 2.5% and about 5% by weight. As an alternative, AX8900 could be utilized.

In an embodiment, the percentage of PCR PET in the composition may be between about 45% and 55% by weight. In an embodiment, the percentage of HDPE PCR may be between about 45% and 55% by weight. In an embodiment, the percentage of HDPE in the composition is between about 20% by weight (25% by volume) and about 60% by weight (66% by volume). In an embodiment, the percentage of HDPE in the composition is between about 30% by weight and about 60% by weight. In an embodiment, the PCR content in the composition may be about 95%.

In an embodiment, the composition may be coated with Michelman® MFB 3510 PEI. In an embodiment, the thickness of the PEI coating is between approximately 0.5 microns and approximately 0.7 microns.

In this embodiment, PCR PET may be combined with HDPE PCR in the presence of a compatibilizer to make an alloy. In an embodiment, hot fill, strength and WVTR seal/peel performance can be controlled by the ratio of HDPE to PET rather than through crystallization.

The inventive alloy goes through an inversion point when one or the other material (HDPE or PET) exceeds 50% by volume. If HDPE is gradually added to PET, it will remain distributed as discrete particles (controlled by the compatibilizer) within a continuous matrix of PET until which time more than 50 volume % is present. Once HDPE exceeds 50% by volume, the morphology goes through inversion where the PET becomes dispersed inside the HDPE (the compatibilizer controls PET particle size at that point). PET essentially becomes a filler that effectively strengthens the container.

Talc has traditionally been used to strengthen HDPE to overcome its softness and its difficulty to thermoform. PET is superior to talc in that it provides better strength at half the specific gravity. PET particles will orient in the direction of stretch during forming. This changes its aspect ratio in the direction of stretch which benefits the container's strength. Talc cannot change its aspect ratio, giving PET an advantage as a filler.

After inversion, HDPE becomes the continuous phase and the container takes on the properties of HDPE, yet derives benefits from the presence of PET. These properties include hot fill resistance, excellent WVTR with favorable trim force. Also, a strength reduction occurs. Exceeding the inversion point to 57 vol % ensures the HDPE is continuous, which thereby ensures hot fill resistance to 180° F.

In an embodiment, the WVTR of the inventive composition is about 60% lower than that of HIPS-PVdC, about 50% stronger than that of HIPS, requires about 20% less trim force than HIPS, and is less expensive than HIPS-PVdC. Additionally, the composition extrudes and thermoforms easily on lab equipment.

In this embodiment, the A/B/A co-extruded structure may be again utilized. After extrusion and optional drying, PEI can be directly coated onto the co-extruded sheet or onto a 3-5 mil alloy film and then laminated onto the co-extruded sheet. In an embodiment, the PEI can be laminated against the hot sheet or remain exposed. PEI laminate or coating should be on the portion of the sheet that will become the outside of the tray. In an embodiment, HDPE or PET film coated with PEI may comprise the laminate and will adhere directly to the cap layer without need for a sealant (adhesive) layer on the PEI laminating film.

The sheet can then be thermoformed into one or more containers, such as portion control containers. In an embodiment, the containers may then be filled and sealed. In an embodiment, the lidding film is one that adheres to HDPE.

The regrind is fully reusable with a need to dry it. The inventive composition is superior in performance to individual raw materials because key properties are retained even after multiple cycles.

HDPE PCR and PET PCR were combined in the presence of a compatibilizer to make an alloy which, when formed into a container, met all specifications, save OTR. OTR specifications are met with a coating of PEI (polyethylene imine). Hot fill, strength and WVTR seal/peel performance can be controlled by the ratio of HDPE to PET rather than through crystallization. This is an ABA (3 layers with 2 extruders) coextruded structure. The cap layer provides sealing performance and visual appeal and the CORE layer provides WVTR, strength and hot fill properties. These layers readily combine into a useful alloy of superior properties and used back into the tray as regrind.

In an Embodiment, the Use of HDPE PCR

As mentioned throughout the specification, in an embodiment, some or all of the sheet/container components will be combined one or more times in a regrind (recycled scrap from post trim operations) to create a core layer with functional properties having a higher value than the virgin components can each provide. Advantageously, the regrind coming from the use of the inventive materials maintains its strength, adhesion, oxygen barrier and hot fill capabilities and is improved over a standard regrind. No adhesives are required in many embodiments of the invention, avoiding adhesive residue in the regrind. The components are stable when melt blended in the regrind. The components are processed and dried at similar conditions, making them ideal for a regrind.

In an embodiment, the invention is substantially or entirely oil resistant, even when in contact with aggressive oils such as butters and dipping sauces. Because the invention does not require a high-acid coating, which damages coating line metal and downstream equipment metal, the manufacturing and processing equipment may experience a longer life than with traditional processes.

The trimming process for the invention is improved as well, as compared to conventional packaging. PET is difficult to trim and can cause product defects and leave shards of plastic around the pack-out area which can get into trays, thus presenting a potential consumer exposure to a choking hazard. Additionally, food processors using these trays must fill, seal and then trim trays into, for example, 20 individual cups. Again, shards of plastic can manifest and cause consumer issues downstream. Also, the life of the trim knife is shortened using conventional PET, resulting in additional down time and more potential for trim defects and consumer exposure to plastic shards. This inventive composition, however, resolves these issues.

The trim force of the inventive composition is similar to that of HIPS, eliminating the above issues. The inventive containers can be formed on conventional PC thermoformers without modifications, other than tooling. The knife life is reasonably similar to or equal to that experienced when using HIPS. Similarly, the barrier coating, fill speed and denesting will be similar to that experienced when using HIPS.

In an embodiment, the invention comprises a unique blend of sustainable materials which simplify the process of making portion control trays, for example, through elimination of the need for crystallization. Advantageously, the invention can be implemented on an existing production portion control thermoformer and meets all ambient fill portion control specifications. Additionally, the invention matches the trim force requirements for tray production and customer trim of trays into cups. Further, the scrap generated in the invention can be reused in the tray making process because it does not contain HIPS or PVdC, components which prevent the reuse of scrap material. This may provide a significant material cost savings and may avoid having to dispose of or process the scrap separately.

In an embodiment, the elimination of PVdC reduces or eliminates fumes from HCl in the PVdC coating and/or HCl from degradation of PVdC during extrusion and forming. In an embodiment, the invention provides a lower coating cost due to the faster coating speed (as compared to PVdC) due to less foaming and a thinner coating thickness. Still further, the invention provides additional cost savings through the elimination of a primer layer, such that only half of the prior processing equipment is necessary. Energy costs may be lower as well due to the necessity of only a single oven.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A packaging structure comprising:
   a core layer which comprises:
      post-consumer resin polyethylene terephthalate;
      a polyolefin;
      ethylene methyl acrylate;
      polypropylene maleic anhydride copolymer;
      at least one polyamide produced from m-xylenediamine; and
      ethylene/methyl acrylate/glycidyl methacrylate terpolymer;
   at least one cap layer disposed adjacent the core layer; and
   a polyethyleneimine coating disposed on one of the at least one cap layer defining an exterior of the packaging structure.

2. The packaging structure of claim 1, wherein the at least one cap layer comprises post-consumer resin.

3. The packaging structure of claim 2, wherein the at least one cap layer further comprises a polyolefin.

4. The packaging structure of claim 1, wherein the at least one cap layer is a first cap layer and a second cap layer, wherein the polyethyleneimine coating is disposed on the second cap layer.

5. The packaging structure of claim 4, wherein the first cap layer is disposed on an interior of the packaging structure.

6. The packaging structure of claim 4, wherein the first cap layer is a food contact layer.

7. The packaging structure of claim 4, wherein the first cap layer and the second cap layer are formed of the same material.

8. The packaging structure of claim 1, wherein the polyolefin is selected from the group consisting of polypropylene, post-consumer resin polypropylene, and high-density polyethylene post-consumer resin.

9. The packaging structure of claim 1, wherein the core layer further comprises blue-white color concentrate.

10. The packaging structure of claim 1, wherein the packaging structure comprises a tray of multiple containers.

11. The packaging structure of claim 1, wherein the core layer and the at least one cap layer are co-extruded.

12. The packaging structure of claim 1, wherein the at least one cap layer provides barrier properties.

13. A formable sheet comprising:
    a core layer comprising:
       post-consumer resin polyethylene terephthalate;
       a polyolefin;
       ethylene methyl acrylate;
       polypropylene maleic anhydride copolymer;
       at least one polyamide produced from m-xylenediamine; and
       ethylene/methyl acrylate/glycidyl methacrylate terpolymer;
    at least one cap layer disposed adjacent the core layer; and
    a polyethyleneimine coating disposed on one of the at least one cap layer defining an exterior of the formable sheet.

14. The formable sheet of claim 13, wherein the at least one cap layer comprises post-consumer resin.

15. The formable sheet of claim 13, wherein the at least one cap layer comprises a blue-white color concentrate.

16. The formable sheet of claim 13, wherein the core layer further comprises blue-white color concentrate.

17. The formable sheet of claim 13, wherein the at least one cap layer is a first cap layer and a second cap layer wherein the polyethyleneimine coating is disposed on the second cap layer.

18. The formable sheet of claim 17, wherein the first cap layer comprises m-xylenediamine.

19. The formable sheet of claim 17, wherein the first cap layer is a food contact layer.

20. A packaging comprising multiple portion control containers formed from a packaging structure comprising:
    a core layer comprising:
       post-consumer resin polyethylene terephthalate;
       a polyolefin;
       ethylene methyl acrylate;
       polypropylene maleic anhydride copolymer;
       at least one polyamide produced from m-xylenediamine; and
       ethylene/methyl acrylate/glycidyl methacrylate terpolymer;
    at least one cap layer disposed adjacent the core layer; and
    a polyethyleneimine coating disposed on one of the at least one cap layer defining an exterior of the packaging structure.

* * * * *